United States Patent [19]

Ishii

[11] Patent Number: 4,780,306

[45] Date of Patent: Oct. 25, 1988

[54] ELECTRICALLY CONDUCTIVE MATERIAL COMPOSED OF TITANIUM OXIDE CRYSTAL AND METHOD OF PRODUCING THE SAME

[75] Inventor: Katsuyuki Ishii, Nagoya, Japan

[73] Assignee: Kabushiki Kaisha Toyota Chuo Kenkyusho, Yokomichi, Japan

[21] Appl. No.: 84,837

[22] Filed: Aug. 13, 1987

[30] Foreign Application Priority Data

Aug. 19, 1986 [JP] Japan .................................. 61-193067

[51] Int. Cl.$^4$ ............................................. C01G 23/047
[52] U.S. Cl. ............................ 423/610; 252/62.3 BT; 252/520; 501/134; 204/290 F; 204/290 R
[58] Field of Search ............... 423/610; 252/62.3 BT, 252/520; 501/134; 204/290 F, 290 R

[56] References Cited

U.S. PATENT DOCUMENTS

| 4,272,354 | 6/1981 | de Nora et al. | 204/290 R |
| 4,528,084 | 7/1985 | Beer et al. | 204/290 F |
| 4,585,540 | 4/1986 | Beer et al. | 204/290 F |
| 4,668,501 | 5/1987 | Shibuta et al. | 423/608 |

Primary Examiner—Robert L. Stoll
Assistant Examiner—Paige C. Harvey
Attorney, Agent, or Firm—Oblon, Fisher, Spivak, McClelland & Maier

[57] ABSTRACT

An electrically conductive material of titanium dioxide crystal comprising at least one electrically conductive portion and at least one less conductive portion, and a method of producing the electrically conductive material, which comprises the steps of applying a catalyst to the surface of the crystal and heating the crystal at a temperature of 300° C. to 600° C. in a gas atmosphere containing an oxidizing gas and a reducing gas.

17 Claims, 6 Drawing Sheets

F I G. 3
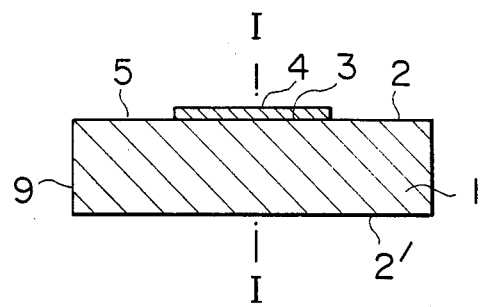
F I G. 4
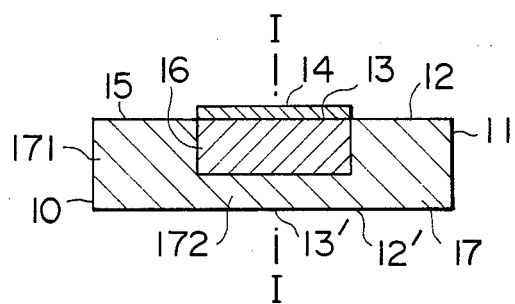

ELECTRICALLY CONDUCTIVE MATERIAL COMPOSED OF TITANIUM OXIDE CRYSTAL AND METHOD OF PRODUCING THE SAME

BACKGROUND OF THE INVENTION

1. Field of the Invention

This invention relates to an electrically conductive material which is composed of titanium oxide crystal, and which can be used for making e.g. elements for optical or electrical devices, elements for gas detecting devices, or electrodes for electrochemical use, and a method of producing the same.

2. Description of the Related Art

If a light yellow and transparent crystal of titanium dioxide ($TiO_2$) which is an electrical insulator is heated in a vacuum or in the presence of a reducing gas, such as $H_2$ or CO gas, it is reduced to form an electrically conductive crystal having a blue or dark brown color. An electrically conductive material which is composed of such $TiO_2$ crystals has already been used widely as a functional material in the electronic and chemical industries.

The conventionally available material has, however, a number of drawbacks which are due to the fact that when it is produced, the whole crystal of $TiO_2$ is heated in a reducing atmosphere. The whole crystal is reduced and becomes electrically conductive. If a particular field of application calls for a crystal of $TiO_2$ which is conductive only in a limited area, an additional work, such as cutting or grinding, is required. It not only makes it difficult to obtain a crystal having desired characteristics of conductivity, but also brings about a number of other problems including the breakage of the crystal and the adherence of foreign matter thereto.

SUMMARY OF THE INVENTION

Under these circumstances, it is an object of this invention to provide an electrically conductive material composed of a crystal of $TiO_2$ having a desired pattern of conductivity in a specific area and a method of producing the same.

According to this invention, there is provided an electrically conductive material of titanium dioxide crystal comprising at least one electrically conductive portion and one less conductive portion which are divided from each other by a plane extending in parallel to the [001] axis of the crystal. And the less conductive portion has a resistivity which is at least 1.5 times higher than that of the conductive portion.

According to this invention, there is also provided a method of producing an electrically conductive material from titanium dioxide crystal which comprises applying onto a part of at least one surface of the crystal a catalyst which comprises at least one of platinum, palladium, rhodium and iridium; and heating the crystal at a temperature of 300° C. to 600° C. in a gas atmosphere containing an oxidizing gas and reducing gas of which the reaction is promoted by the catalyst so as to form at least one electrically conductive portion and at least one less conductive portion. The conductive and less conductive portions are divided from each other by a plane extending in parallel to the [001] axis of the crystal.

BRIEF DESCRIPTION OF THE DRAWINGS

FIGS. 3 and 4 are views similar to FIG. 2, but showing a first embodiment of this invention;

DETAILED DESCRIPTION OF THE INVENTION

Figure 1:
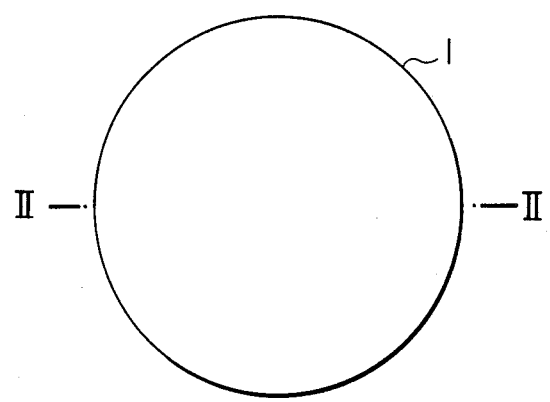
FIG. 1 is a top plan view of a crystal of $TiO_2$ which is employed for producing an electrically conductive material according to this invention.

This invention is based on the fact that if a crystal of $TiO_2$ carrying a catalytic metal is heated at an appropriate temperature in a gas atmosphere containing an oxidizing gas and a reducing gas in an inert carrier gas, its electrical conductivity shows a great difference from that of a crystal of $TiO_2$ not carrying any catalytic metal.

A crystal of $TiO_2$ carrying a catalytic metal, such as Pt, Pd or Rh, on its surface lying in a plane crossing its [001] axis (hereinafter called the "C axis") and a crystal of $TiO_2$ not carrying any such catalytic metal were heated in a gas atmosphere obtained by adding $O_2$ gas as an oxidizing gas and $H_2$ or CO gas or both as a reducing gas to an inert carrier gas, such as $N_2$, Ar or He gas. They showed different characteristics of conductivity as will hereinafter be described.

The same results were obtained irrespective of the presence of the catalytic metal when the crystals were heated at a temperature of at least 650° C., or when they were heated at a temperature of at least 300° C. in an equilibrium gas atmosphere which had been obtained by the reaction of the gas atmosphere in the presence of e.g. an oxidizing catalyst. More specifically, if the proportion of the $O_2$ gas in the gas atmosphere was smaller than its stoichiometric ratio (i.e. $O_2/(H_2+CO)=\frac{1}{2}$) (i.e. the atmosphere was reducing), each crystal was reduced and its reduction propagated from its surface to its interior, resulting in the formation of an electrically conductive portion having a blue or dark brown color. On the other hand, if the proportion of the $O_2$ gas was larger than its stoichiometric ratio (i.e. the atmosphere was oxidizing), each crystal was oxidized and its oxidation propagated from its surface to its interior to reduce the conductivity, resulting in the formation of a less conductive portion or an insulating portion having a light yellow color. These results coincide with the general fact that a reducing reaction takes place in a reducing atmosphere, while an oxidizing reaction occurs in an oxidizing atmosphere.

Different results were, however, obtained from the heating of the crystals at a temperature of 300° C. to 550° C. when the proportions $M_{O2}$, $M_{H2}$ and MCO of $O_2$, $H_2$ and CO gases, respectively, in the gas atmosphere satisfied the following relationship:

$$1/20(M_{H2}+M_{CO}) < M_{O2} < \tfrac{1}{2}(M_{H2}+M_{CO})$$

(i.e. $M_{O2} - \frac{1}{2}(M_{H2} + M_{CO}) < 0$; the proportion of the $O_2$ gas was smaller than its stoichiometric ratio, and the atmosphere was reducing), or $$\tfrac{1}{2}(M_{H2}+M_{CO}) < M_{O2} < M_{H2} + \tfrac{1}{2}M_{CO}$$

(i.e. $0M_{O2} + \frac{1}{2}(M_{H2} + M_{CO})$);
the proportion of the $O_2$ gas was larger than its stoichiometric ratio, and the atmosphere was oxidizing), or at a temperature of 400° C. to 550° C. when the proportions $M_{O2}$ and $M_{H2}$, of $O_2$ and $H_2$ gases, respectively, in the gas atmosphere containing oxygen gas, hydrogen gas, and nitrogen gas satisfied the following relationship:

$$1/10 M_{H2} < M_{O2} < M_{H2}$$

The crystal carrying the catalytic metal formed an electrically conductive portion having a blue color and extending along its C axis from its surface, which carried the catalytic metal, to its interior. On the other hand, the crystal not carrying any catalytic metal formed a less conductive, or insulating portion extending from its surface to its interior along its C axis. These results differed from what had generally been expected.

The method of this invention is essentially based on the results which have hereinabove been described, and makes it possible to produce a crystal of $TiO_2$ having a selectively conductive portion or portions by applying a catalytic metal to a selected part or parts of its surface.

If a crystal of $TiO_2$ carrying a platinum catalyst is, for example, heated at a temperature of 500° C. in a gas atmosphere G obtained by adding $O_2$ gas at a flow rate of 10 cc per minute and $H_2$ gas at a flow rate of 40 cc per minute to $N_2$ carrier gas having a flow rate of 1000 cc per minute, it is possible to form an electrically conductive portion having a blue color and a resistivity not exceeding 100 Ω cm and extending from its surface carrying the catalyst to its interior along its C axis, while a less conductive or insulating portion having a resistivity of at least $10^5$ Ω cm is formed along its C axis and extends from its surface not carrying any catalyst to its interior.

Further, an electrically conductive portion or portions can be produced in a desired portion of the $TiO_2$ crystal, even in the inside portion of the crystal, by combining the steps of heating the crystal, removing the catalyst, and applying the catalyst.

The catalyst promotes the reaction of the $O_2$ and $H_2$ gases which are diluted by the carrier gas, and which would otherwise fail to react with each other satisfactorily even upon heating to a temperature of, say, 500° C. The oxygen and hydrogen gases do not satisfactorily react with each other in that part of the crystal surface which does not carry any catalyst, even if the crystal is heated to a temperature of 500 ° C. in the gas atmosphere G as hereinabove described. That part of the crystal is oxidized by the $O_2$ gas in the gas atmosphere and lowers its conductivity (or increases its resistivity). On the other hand, the hydrogen atoms or $H^+$ ions which result from the reaction of he $O_2$ and $H_2$ gases are selectively rapidly diffused along the C axis of the crystal in its surface carrying the catalyst. They act as a donar to raise the conductivity (or lower the resistivity) of the $TiO_2$ crystal which is an N type semiconductor. These facts are believed to explain why it is possible to obtain a crystal of $TiO_2$ having portions of different conductivity.

Similar results can be obtained by employing different compositions of gas atmosphere, different heating temperatures or different modes of catalyst application, as will hereinafter be described by way of example.

For example, it is also possible to employ a gas atmosphere in which the proportions $M_{O2}$, $M_{H2}$ and $M_{CO}$ of $O_2$, $H_2$ and CO gases, respectively, satisfy the following relationship: $2M_{O2} \leq (M_{H2} + M_{CO}) < 20 M_{O2}$
and the proportion of $O_2$ gas is, therefore, lower than its stoichiometric ratio (i.e. a reducing atmosphere). More specifically, it is possible to employ, for example, a gas atmosphere G1 obtained by adding $O_2$ gas at a flow rate of 10 cc per minute, $H_2$ gas at a flow rate of 30 cc per minute and CO gas at a flow rate of 10 cc per minute to $N_2$ carrier gas having a flow rate of 1000 cc per minute, or a gas atmosphere G2 obtained by adding to $N_2$ carrier gas having a flow rate of 2000 cc per minute $O_2$ gas at a flow rate of 10 cc per minute and a mixture of $H_2$ and CO gases at a flow rate of 20 to 200 cc per minute.

It is also possible to employ a gas atmosphere in which the proportions $M_{O2}$, $M_{H2}$ and $M_{CO}$ of $O_2$, $H_2$ and CO gases, respectively, satisfy the following relationship:

$$(M_{H2} + M_{CO}) < 2M_{O2} < M_{H2} + (M_{H2} + M_{CO})$$

and the proportion of $O_2$ gas is, therefore, higher than its stoichiometric ratio (i.e. an oxidizing atmosphere). More specifically, it is possible to employ, for example, a gas atmosphere G3 obtained by adding $O_2$ gas at a flow rate of 10 cc per minute and $H_2$ gas at a flow rate of 15 cc per minute to $N_2$ carrier gas having a flow rate of 1000 cc per minute, or a gas atmosphere G4 obtained by adding $O_2$ gas at a flow rate of 20 cc per minute, $H_2$ gas at a flow rate of 20 cc per minute and CO gas at a flow rate of 10 cc per minute to Ar or He carrier gas having a flow rate of 2000 cc per minute.

While the specific temperature of 500° C. has hereinbefore been mentioned, it is also possible to employ any other temperature falling within the range of 300° C. to 550° C. if the crystal is held at that temperature for an appropriately selected length of time.

While the platinum catalyst, which can be prepared from a solution of chloroplatinic acid ($H_2PtCl_6 \cdot 6H_2O$), has been mentioned specifically, it is also possible to use a palladium catalyst which can be prepared from a solution of palladium chloride ($PdCl_2$), a rhodium catalyst which can be prepared from a solution of rhodium chloride ($RhCl_3$), or an iridium catalyst which can be prepared from a solution of iridium chloride ($IrCl_3$)

The material of this invention is useful for a wide variety of applications. For example, it can be used for making an optical element which includes a conductive portion having a blue color and occupying only a part of its interior, or an electrical resistance element which includes an internally located principal resistance portion and an exposed electrode portion. These constructions make it possible to prevent any change of properties from occurring from the presence of foreign matter when those devices are used in an aqueous solution, a stream of exhaust gas of combustion, etc.

The material can also be used for making a gas detecting element or an electrode for electrochemical use which includes a portion having a shape suitable for a chemical reaction and an appropriate degree of conductivity and a highly conductive portion for electrical connection having only a small loss of resistance.

Figure 2:
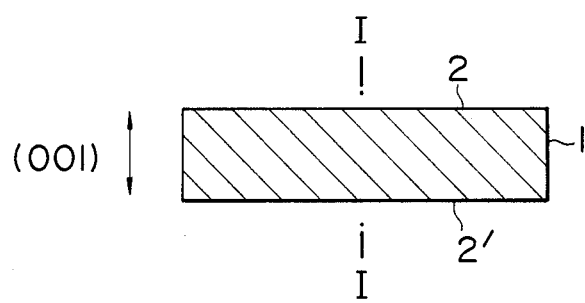
FIG. 2 is a sectional view taken along the line II—II of FIG. 1 and containing the longitudinal axis I—I of the crystal.

The invention will now be described more specifically with reference to several examples thereof. FIGS. 1 and 2 show a crystal of $TiO_2$ which was used to carry out this invention, as will hereinafter be described. The crystal 1 was a single crystal of TiO$_2$ in the form of a disk having a diameter of 16 mm and a thickness of 3 mm. Its thickness extended along its [001] axis (or "C axis"). It had an upper surface 2 and a lower surface 2' lying in parallel to its (001) plane. The surfaces of the crystal were ground by SiC particles having a diameter of one micron and were ultrasonically cleaned.

EXAMPLE 1

A first embodiment of this invention is shown in FIGS. 3 and 4. A solution S which had been prepared by dissolving 100 mg of chloroplatinic acid (H$_2$PtCl$_6$.6H$_2$O) in 10 cc of distilled water was applied to a circular area 3 having a diameter of 8 mm in the center of the upper surface 2 of a crystal 1 of TiO$_2$, while no solution S was applied to an annular area 5 surrounding the circular area 3 or the lower surface 2', whereby a crystal sample 9 carrying a layer 4 of chloroplatinic acid was prepared, as shown in FIG. 3.

The sample 9 was placed in a quartz tube having a diameter of 4 cm and containing a gas atmosphere G obtained by adding O$_2$ gas at a flow rate of 10 cc per minute and H$_2$ gas at a flow rate of 40 cc per minute to a carrier gas of N$_2$ having a flow rate of 1000 cc per minute. The quartz tube, the gas atmosphere G and the sample 9 were heated to, and held at, a temperature of 500° C. for 200 minutes. After the sample 9 had been cooled to an ordinary room temperature in the gas atmosphere G, it was removed from the quartz tube to yield a crystal sample 10.

The sample 10 was a crystal 11 of TiO$_2$ having in the center of its upper surface 12 a circular area 13 carrying a catalyst 14 of platinum which had been formed by the decomposition of chloroplatinic acid, as shown in FIG. 4. The crystal 11 was found to include a conductive portion 16 which had been formed under the catalyst 14, and a less conductive or insulating portion 17 surrounding the conductive portion 16. The conductive portion 16 extended from the circular area 13 to an intermediate plane and had a thickness which was at least 100 microns, but was not larger than 4/5 of the thickness of the crystal 11, as measured along its C axis. The portion 16 had a blue color and a resistivity not exceeding 100 Ω cm. The less conductive or insulating portion 17 consisted of an annular portion 171 extending from the annular area 15 of the upper surface 12 not carrying any catalyst to the lower surface 12' of the crystal 11 and having a thickness which was equal to that of the crystal 11, and a circular portion 172 located between the central part 13' of the lower surface 12' and the bottom of the conductive portion 16 and surrounded by the annular portion 171. The portion 17 had a resistivity of at least 10$^{55}$ Ω cm.

EXAMPLE 2

Figure 5:
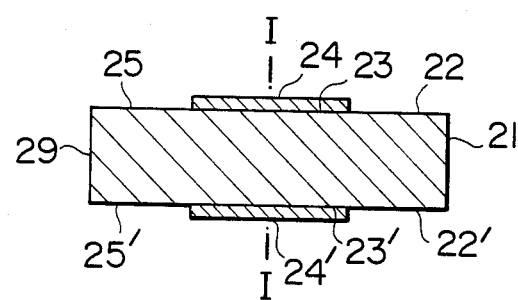
FIGS. 5 and 6 are views similar to FIG. 2, but showing a second embodiment of this invention.
Figure 6:
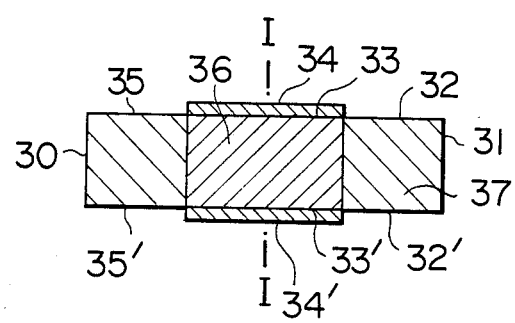

A second embodiment of this invention is shown in FIGS. 5 and 6. Numeral 21 in FIG. 5 indicates a crystal of TiO$_2$ which corresponds to the crystal 1 shown in FIGS. 1 and 2. A solution S of chloroplatinic acid, which has been described in EXAMPLE 1, was applied to both a circular area 23 in the center of the upper surface 22 of the crystal 21 and a circular area 23' in the center of its lower surface 22', both having a diameter of 8 mm, while no solution S was applied to either an annular area 25 surrounding the circular area 23 or an annular area 25' surrounding the circular area 23', whereby a crystal sample 29 carrying an upper layer 24 of chloroplatinic acid and a lower layer 24' of chloroplatinic acid was prepared, as shown in FIG. 5.

The procedure of EXAMPLE 1 was repeated for heating the sample 29 to 500° C., holding it thereat for 200 minutes and cooling it, whereby a crystal sample 30 was obtained.

The sample 30 was a crystal 31 of TiO$_2$ carrying a catalyst 34 of platinum, which had been formed by the decomposition of chloroplatinic acid in the upper layer 24, in a circular area 33 in the center of its upper surface 32 and a catalyst 34' of platinum, which had been formed by the decomposition of chloroplatinic acid in the lower layer 24', in a circular area 33' in the center of its lower surface 32', as shown in FIG. 6. The crystal 31 was found to include a conductive portion 36 which had been formed between the upper and lower catalysts 34 and 43', and a less conductive or insulating portion 37 surrounding the conductive portion 36. The conductive portion 36 had a thickness which was equal to that of the crystal 31. It had a blue color and a resistivity not exceeding 100 Ω cm. The less conductive or insulating portion 37 was an annular portion extending between an upper annular area 35 not carrying any catalyst and a lower annular area 35' not carrying any catalyst, either, and having a thickness which was equal to that of the crystal 31, as measured along its C axis. The portion 37 had a resistivity of at least 10$^5$ Ω cm.

EXAMPLE 3

Figure 7:
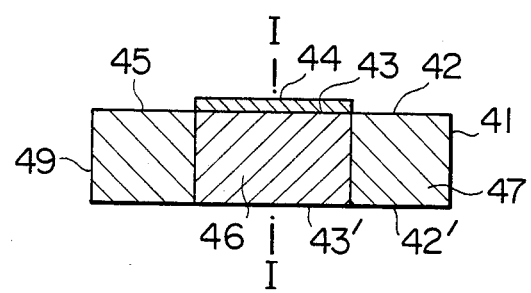
FIGS. 7 and 8 are views similar to FIG. 2, but showing a third embodiment of this invention.
Figure 8:
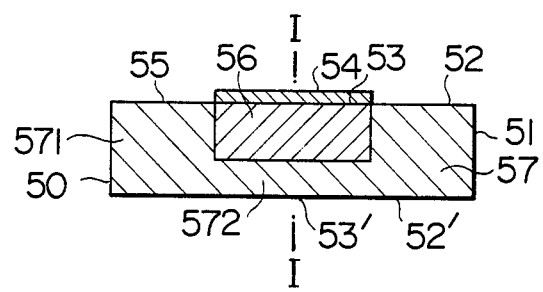

A third embodiment of this invention is shown in FIGS. 7 and 8. FIG. 7 shows a sample crystal 49 which was prepared by grinding the lower surface 32' of the sample 30 shown in FIG. 6 (EXAMPLE 2) with SiC particles having a diameter of one micron to remove the catalyst 34' therefrom and cleaning it ultrasonically. The sample 49 was, therefore, a crystal 41 of TiO$_2$ carrying a catalyst 44 of platinum in a circular area 43 in the center of its upper surface 42, but not carrying any catalyst in an annular area 45 surrounding the circular area 43 or in any part of its lower surface 42'. It had a conductive portion 46 and an insulating portion 47 corresponding to the portions 36 and 37, respectively, of the crystal shown in FIG. 6.

The procedure of EXAMPLE 1 was repeated for heating and cooling the sample 49, except that it was held at 500° C. for a period of 100 minutes, whereby a crystal sample 50 was obtained.

The sample 50 was a crystal 51 of TiO$_2$ including a conductive portion 56 located under a catalyst 54 of platinum carried on a circular area 53 in the center of its upper surface 52 and a less conductive or insulating portion 57 surrounding the conductive portion 56. The conductive portion 56 had a thickness which was at least 100 microns, but was not larger than 4/5 of the thickness of the crystal 51, as measured along its C axis. It had a blue color and a resistivity not exceeding 100 Ω cm. The insulating portion 57 consisted of an annular portion 571 extending from the annular are 55 of the upper surface 52 not carrying any catalyst to the lower surface 52' of the crystal 51 and having a thickness which was equal to that of the crystal 51, and a circular portion 572 surrounded by the annular portion 571 and located between the central circular area 53' of the lower surface 52', from which the catalyst had been removed, and the bottom of the conductive portion 56. The portion 57 had a resistivity of at least 10$^5$ Ω cm.

EXAMPLE 4

Figure 9:
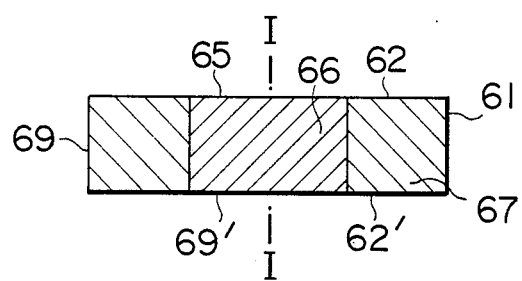
FIGS. 9 and 10 are views similar to FIG. 2, but showing a fourth embodiment of this invention.
Figure 10:
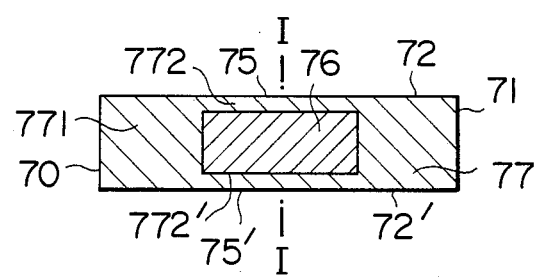

A fourth embodiment of this invention is shown in FIGS. 9 and 10. FIG. 9 shows a crystal sample 69 which was prepared by grinding both of the upper and lower surfaces 32 and 32' of the sample 30 shown in FIG. 6 (EXAMPLE 2) with SiC particles having a diameter of one micron to remove the catalysts 34 and 34' therefrom and cleaning them ultrasonically. The sample 69 was, therefore, a crystal 61 of $TiO_2$ including a conductive portion 66 located between the central circular areas 65 and 65' of its upper and lower surfaces 62 and 62', respectively, from which the catalysts had been removed, and having a thickness which was equal to that of the crystal 61, and an insulating portion 67 surrounding the conductive portion 66.

The procedure of EXAMPLE 1 was repeated for heating and cooling the sample 69, except that it was held at 500° C. for 15 minutes, whereby a crystal sample 70 was obtained, as shown in FIG. 10.

The sample 70 was a crystal 71 of $TiO_2$ including a conductive portion 76 having a resistivity not exceeding 100 Ω cm and a less conductive or insulating portion 77 having a resistivity of at least $10^5$ Ω cm. The conductive portion 76 was a circular portion located completely within the crystal 71 and having an upper end and a lower end which were spaced apart by a distance of at least 100 microns from the central circular areas 75 and 75' in the upper and lower surfaces 72 and 72', respectively, of the crystal 71, from which the catalysts had been removed. The portion 76 had a thickness which was at least equal to 1/5 of that of the crystal 71, as measured along its C axis. The insulating portion 77 consisted of an annular portion 771 corresponding to the insulating portion 67 of the crystal 61 shown in FIG. 9 and a pair of circular portions 772 and 772' surrounded by the annular portion 771 and located on the opposite sides of the conductive portion 76 from each other. Each of the portions 772 and 772' had a thickness which was at least 100 microns, but was not larger than one-third of that of the crystal 71.

EXAMPLE 5

Figure 11:
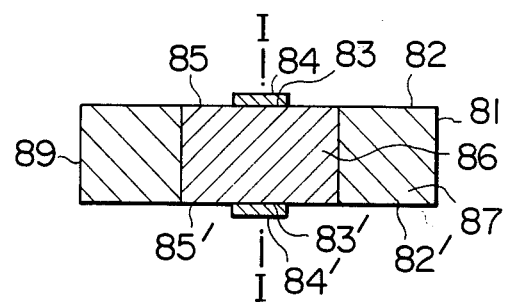
FIGS. 11 and 12 are views similar to FIG. 2, but showing a fifth embodiment of this invention.
Figure 12:
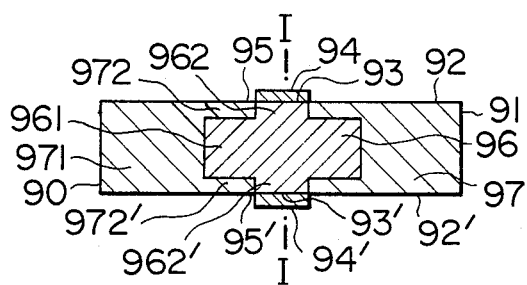

A fifth embodiment of this invention is shown in FIGS. 11 and 12. FIG. 11 shows a crystal sample 89 prepared from a crystal 81 of $TiO_2$ which was identical to the crystal 61 shown in FIG. 9 (EXAMPLE 4). The crystal 81 had a conductive portion 86 and an insulating portion 87 corresponding to the conductive and insulating portions 66 and 67, respectively, of the crystal 61. A solution S of chloroplatinic acid, which had been prepared as hereinbefore described, was applied to both a circular area 83 in the center of the central area 85 of the upper surface 82 of the crystal 81 and a circular area 83' in the center of the central area 85' of its lower surface 82', both of the areas 83 and 83' having a diameter of 3 mm, whereby a pair of layers 84 and 84' of chloroplatinic acid were formed on the upper and lower surfaces, respectively, of the sample 89.

The procedure of EXAMPLE 1 was repeated for heating and cooling the sample 89, except that it was held at 500° C. for 15 minutes, whereby a crystal sample 90 was obtained, as shown in FIG. 12.

The sample 90 was a crystal 91 of $TiO_2$ carrying catalysts 94 and 94' of platinum, which had been formed by the decomposition of chloroplatinic acid, on circular areas 93 and 93' in the centers of its upper and lower surfaces 92 and 92', respectively.

The crystal 91 included a conductive portion 96 having a resistivity not exceeding 100 Ω cm and a less conductive or insulating portion 97 having a resistivity of at least $10^5$ Ω cm. The conductive portion 96 consisted of an inner portion 961 spaced apart by a distance of at least 100 microns from both of the upper and lower surfaces 95 and 95' of the crystal and having a thickness which was at least equal to 1/5 of that of the crystal 91, and a pair of axially projecting portions 962 and 962' extending along the C axis from the inner portion 961 to the circular areas 93 and 93', respectively, and each having a thickness of at least 100 microns. The insulating portion 97 consisted of an annular portion 971 corresponding to the insulating portion 87 of the crystal 81 shown in FIG. 11, and a pair of annular portions 972 and 972' surrounded by the annular portion 971, surrounding the conductive portions 962 and 962', respectively, and each having a thickness which was at least 100 microns, but was not larger than one-third of that of the crystal 91.

What is claimed is:

1. An electrically conductive material of titanium dioxide crystal comprising at least one electrically conductive portion and at least one less conductive portion which are divided from each other by a plane extending in parallel to the C axis of said crystal, said less conductive portion having a resistivity which is at least 1.5 times higher than that of said conductive portion.

2. A material as set forth in claim 1, wherein said crystal is in the form of a disk having a thickness which extends along said C axis, said disk having a pair of principal surfaces lying in parallel to the (001) plane of said crystal.

3. A material as set forth in claim 1, wherein said conductive portion extends from one of said principal surfaces to a plane intermediate between said principal surfaces.

4. A material as set forth in claim 1, wherein said conductive portion extends from one of said principal surfaces to the other.

5. A material as set forth in claim 1, wherein said conductive portion is completely confined within said crystal.

6. A material as set forth in claim 1, wherein said conductive portion consists of a portion confined within said crystal and a portion connected to said confined portion and extending from one of said principal surfaces to the other.

7. A method of producing an electrically conductive material from titanium dioxide crystal which comprises:
    applying onto a surface portion of at least one surface of the crystal a catalyst comprising at least one member selected from the group consisting of platinum, palladium, rhodium and iridium; and
    heating said crystal at a temperature of 300° C. to 600° C. in a gas atmosphere containing an oxidizing gas and a reducing gas, wherein the production of said conductive material is promoted by said catalyst so as to form at least one electrically conductive portion and at least one less conductive portion, said conductive and less conductive portions divided from each other by a plane extending in parallel to the C axis of the crystal.

8. A method as set forth in claim 7, wherein said catalyst is applied in a solution of chloroplatinic acid, and said catalyst is platinum.

9. A method as set forth in claim 8, wherein said atmosphere is prepared by adding oxygen gas at a flow rate of 10 cc per minute and hydrogen gas at a flow rate of 40 cc per minute to a carrier gas of nitrogen having a flow rate of 1000 cc per minute.

10. A method as set forth in claim 9, wherein said temperature is 500° C. and said crystal is held at said temperature for a period of 15 to 200 minutes.

11. A method as set forth in claim 10, wherein said crystal is in the form of a disk having a pair of principal surfaces and said catalyst is applied onto at least one of said principal surfaces.

12. A method as set forth in claim 7, wherein said catalyst is applied to both surfaces of the crystal, and said method further comprises
removing said catalyst from both the surfaces of said crystal; and
further heating said crystal at a temperature of 300° C. to 600° C. in a gas atmosphere containing an oxidizing gas,
thereby forming said electrically conductive portion confined within said crystal.

13. A method as set forth in claim 7, wherein said catalyst is applied to both surfaces of said crystal, and said method further comprises:
removing said catalyst from both the surfaces of said crystal;
further applying a catalyst comprising at least one member selected from the group consisting of platinum, palladium, rhodium and irridium to a portion smaller than the portion from which said catalyst was removed on each of both the surfaces of the crystal;
further heating said crystal at a temperature of 300° C. to 600° C. in a gas atmosphere containing an oxidizing gas and a reducing gas of which the reaction is promoted by said catalyst,
thereby forming said electrically conductive portion having a portion extending through the crystal in parallel to the C axis and at least one portion confined inside the crystal.

14. A method as set forth in claim 7, wherein said oxidizing gas comprises oxygen gas, and said reducing gas comprises hydrogen gas.

15. A method as set forth in claim 14, wherein said gas atmosphere further contains an inert gas including at least one of nitrogen gas, argon gas, and helium gas.

16. A method as set forth in claim 7, wherein said gas atmosphere contains oxygen gas of which molar concentration is expressed by $M_{O2}$, as oxidizing gas, and hydrogen gas of which proportion is expressed by $M_{H2}$, and carbon monoxide gas of which molar concentration is expressed by $M_{CO}$, as reducing gas, and said gas atmosphere satisfies the condition:

$$1/20(M_{H2}+M_{CO}) < M_{O2} < M_{H2} + \tfrac{1}{2}M_{CO}$$

17. A method as set forth in claim 7, wherein said gas atmosphere contains oxygen gas of which molar concentration is expressed by $M_{O2}$, as oxidizing gas, hydrogen gas of which molar concentration is expressed by $M_{H2}$, and nitrogen gas,
said gas atmosphere satisfies the condition:

$$1/10 M_{H2} < M_{O2} < M_{H2}$$

said heating temperature being within 400° C.–550° C.

* * * * *